No. 707,428. Patented Aug. 19, 1902.
W. P. KIDDER.
APPARATUS FOR REMOVING BARK FROM TREES.
(Application filed Nov. 5, 1900.)
(No Model.)
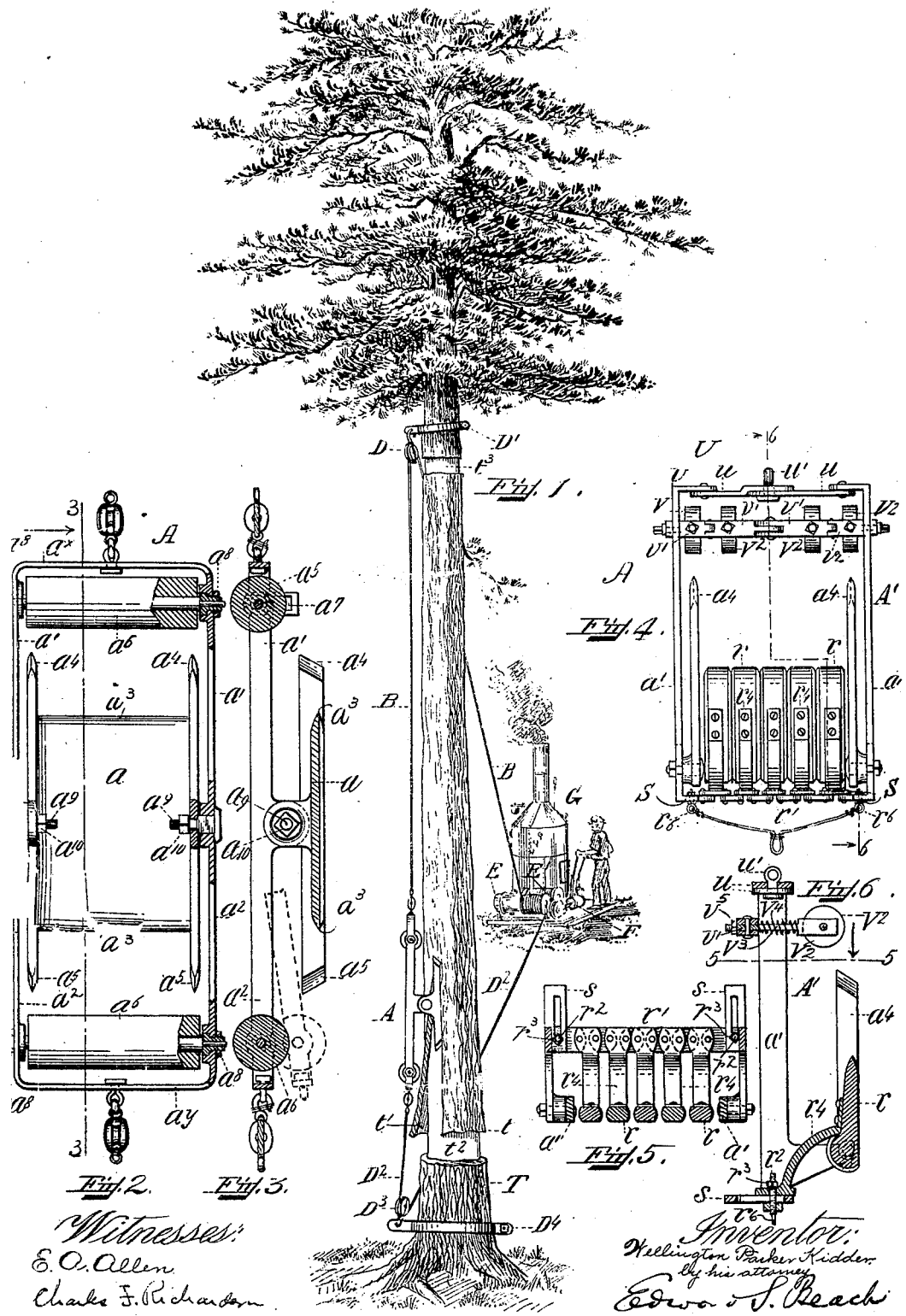

UNITED STATES PATENT OFFICE.

WELLINGTON PARKER KIDDER, OF BOSTON, MASSACHUSETTS, ASSIGNOR, BY MESNE ASSIGNMENTS, TO HIMSELF, GEORGE E. MATTHEWS, AND FRANK H. GOODYEAR AND CHARLES W. GOODYEAR, DOING BUSINESS UNDER THE FIRM-NAME OF F. H. & C. W. GOODYEAR, OF BUFFALO, NEW YORK.

APPARATUS FOR REMOVING BARK FROM TREES.

SPECIFICATION forming part of Letters Patent No. 707,428, dated August 19, 1902.

Application filed November 5, 1900. Serial No. 35,503. (No model.)

*To all whom it may concern:*

Be it known that I, WELLINGTON PARKER KIDDER, a citizen of the United States, residing at Boston, in the county of Suffolk and State of Massachusetts, have invented certain new and useful Improvements in Apparatus for Removing Bark from Trees and Tree-Trunks, of which the following is a specification, reference being had therein to the accompanying drawings.

Figure 1 is a perspective view showing my apparatus removing bark from a tree-trunk. Fig. 2 is a top plan of bark cutter and separator. Fig. 3 is a longitudinal section on line 3 3 in Fig. 2, the dotted lines showing the adjustability of cutter to separator. Fig. 4 is a modification of bark cutter and separator. Fig. 5 is a transverse section of said modification on line 5 5 in Fig. 6. Fig. 6 is a longitudinal section on line 6 6 in Fig. 4.

The removal from standing trees and standing tree-trunks of bark used in tanning and for other purposes is according to present methods unduly laborious and expensive. Generally speaking, the trees have been heretofore felled before the bark is removed, and, so far as I know, the bark has been heretofore stripped off from standing trunks by means of hand tools.

My apparatus is especially intended and adapted for removing bark from trees before they are felled, thus getting rid of the expense and delay of felling, as work strictly preparatory to taking off the bark, and leaving the tree standing, but ready for cutting at some future time convenient to the lumbermen. Removal of bark from unfelled trees and tree-trunks is advantageous to both the bark dealer and to the lumber dealer. It saves the bark dealer the expense of cutting down the trees and then turning the trunks over in order to get at the bark on the under sides of the trunks and also saves some cutting off of limbs and branches. This is a material advantage to the bark collector. It also prevents the trunks from lying on the ground or in the snow or mud during the interval between the taking off of the bark and the operations of the lumbermen. This is a material advantage to the latter.

It is said by those familiar with the bark trade that about three million cords of hemlock bark are used annually in the State of Pennsylvania alone. This statement, if only approximately correct, is sufficient to indicate the volume of the bark trade as a whole and the practical importance of an invention whereby the bark or some of the bark of commerce is removed from trees while standing.

It is a well-known fact that forest fires are more destructive of felled trees than they are of standing trees. Leaving the trunks standing after the bark is taken off will be a very great advantage to the owners of the timber, because of the very greatly reduced liability of standing trees from which the bark has been mainly removed to be injured by forest fires. For example, the insurance rate on felled timber is commonly excessively high, while the insurance rate on standing timber is relatively low. Standing trees are much safer from forest fires than felled trees, because in the case of standing trees the branches are considerably above the ground and are not easily reached by the fires, whereas in the case of felled trees the branches are on the ground and make a ready fuel. Insurance companies commonly regard the risk of felled timber as one of the greatest they can assume, and the rate they charge at the present time for insurance on felled timber is about two per cent. per month, whereas the common rate at the present time upon standing timber is at from one and one-half to two per cent. per annum.

In the drawings illustrating the principle of my invention and the best mode now known to me of embodying that invention, T represents a standing tree, and *t* its bark.

The bark-cutter and bark-stripper A may be of any desired construction without departing from my invention, and, as shown herein, either a double-ended or a single-ended device, as desired. In the preferred form of my invention it is double-ended, in order that it may operate in cutting each way lengthwise along the tree-trunk. For brevity I will hereinafter term the device A a "bark-stripper."

Bark-stripper A in its present form comprises a rectangular frame, within which is mounted a transverse web $a$, which is provided forwardly of one transverse wedge-shaped edge $a^3$ with parallel cutters $a^4$ and forwardly of the other transverse wedge-shaped edge $a^3$ with parallel cutters $a^5$. The sides of said rectangular frame which are parallel with said cutters $a^4$ are marked $a'$ and the sides of said rectangular frame which are parallel with said cutters $a^5$ are marked $a^2$. The web $a$ is between said cutters, one of its wedge-shaped edges $a^3$ being at right angles to the cutters $a^4$ and the other wedge-shaped edge $a^3$ being at right angles to the cutters $a^5$, which extend in the opposite direction from the cutters $a^4$. Said arms $a'$ $a'$ and $a^2$ $a^2$ are connected at one end by the transverse piece $a^x$ and at the other end by the transverse piece $a^y$. The opposite transverse edges of web $a$ are each wedge-shaped at $a^3$, the purpose of the transverse wedge being to facilitate the web entering between the bark $t$ and tree-trunk to rip the bark from the trunk while the cutters $a^4$ $a^4$ or $a^5$ $a^5$ are traveling along the trunk in the direction of its length. Web $a$ is preferably provided with suitable sets of parallel cutters $a^4$ $a^4$ and $a^5$ $a^5$. These cutters are at right angles to the intermediate wedges $a^3$ and project away therefrom, each set of cutters projecting, respectively, in the direction of the side arms $a'$ $a'$ and $a^2$ $a^2$ and web $a$ being between the cutters. Preferably the cutters $a^4$ $a^4$ and $a^5$ $a^5$ are made integral with web $a$, each side of which is attached midway of its length to arms $a'$ $a'$ and $a^2$ $a^2$. The purpose of cutters $a^4$ $a^4$ and $a^5$ $a^5$ is to slit the bark into strips as the intermediate wedge $a^3$ travels lengthwise of the trunk to cut and strip the bark therefrom. The free end portion $t'$ of the bark strip will pass outwardly between a pair of arms and over web $a$ when the apparatus is in operation. Each pair of arms $a'$ $a'$ and $a^2$ $a^2$ may be provided, if desired, with a suitable guide—such, for example, as the rollers $a^5$ $a^6$. The purpose of these rollers is to facilitate the travel of the bark-stripper along the trunk, one of the rollers bearing on the outer surface of the bark and traveling in advance of the wedge. If desired, these rollers $a^5$ and $a^6$ may be made adjustable from and toward the arms which support them, so as to carry them nearer to or farther from the paths of the corresponding cutters and intermediate wedge. One of many good ways of obtaining this adjustment is to provide each roller with journals adjustable in channels $a^7$, formed in the frame. Nuts $a^8$ secure these journals and bearings in proper adjustment, or preferably the web $a$ and cutters $a^4$ are rigid and are pivoted to the frame by bolt-forming pivots $a^9$, which are square in cross-section for that portion of their length within and a short distance outside the frame, while their inner portions through the frame are circular and in part threaded for the reception of the nut $a^{10}$. The cutters and web are preferably free to turn on these circular portions; but by means of the nuts and the shoulder formed by the square portion the cutters and web can be clamped tight in any desired position relatively to the frame. By the described adjustment of the rollers $a^5$ and $a^6$ the rollers may be made to limit the depth of cut of the cutters, and thereby adapt the bark-stripper to different thicknesses of bark. Such an adjustment is desirable in some cases, but without departure from my invention may be dispensed with, as may the turning of the web and cutters in their pivotal connection with the frame-piece or side arms.

To bark-stripper A a flexible reach B (or device for moving the bark-stripper lengthwise the standing trunk) is secured. I prefer to use a rope or chain for this purpose. One object of having the reach flexible is that it may be taken up and got out of the way as the bark-stripper is moved lengthwise of the standing trunk. In the present form of my invention flexible reach B leads from bark-stripper A over a suitable guide D, which is preferably in the form of a pulley and is mounted close to the standing tree-trunk, to a take-up drum E' of take-up device E, on which drum the flexible reach is wound as the stripper ascends the tree-trunk. Drum E' is preferably rotated by a motor F, which is in this instance in the form of an engine connected to a portable steam-boiler G. The guide D, as above described, being in such proximity to the trunk that it guides the reach in substantial parallelism with the lengthwise axis of the trunk, the reach B will when the drum is rotated to take up the reach pull the bark-stripper up the standing tree-trunk in lengthwise direction thereof and at the same time keep the bark-stripper in its operative position—that is, with the web $a$ between the bark and trunk. The pulley-supporting guide D' is made so that the pulley D suspended from it, is in such near proximity to the side of the tree that the pulley, flexible reach, and pulley-support B' may be said to constitute a means for holding the stripper between the bark and wood. If the pulley D were mounted at such a distance from the side of the tree that the flexible reach B from the stripper to the pulley stood out at a substantial angle to the side of the tree, then the stripper would be exceedingly liable to be pulled out from between the bark and wood when the reach were drawn over the pulley. It is of importance in most cases to have the reach flexible, so that whether it is taken up by hand after passing over the guide or is taken up by machinery after passing over the guide it may be readily disposed of by coiling up. For example, guide D may be supported at the desired distance above the ground or from one end of the trunk by any suitable support and attached to the tree in any desired manner. In its present form guide-support D' consists of two semicircular members, each of which is provided with two ears that have holes therein for the reception of bolts. To use the guide-support D', its members are placed on opposite sides of the trunk and confined in place by the bolts passed through the holes in the adjacent ears and then secured therein by nuts, which force the guide-support into engagement with the trunk. In practice guide-support D' is applied well up the trunk of standing trees, many limbs of which may be first cut off, if so desired, so as to secure the longest bark strips feasible. The support D' projects away from the tree-trunk, so that the guide D is held out from the trunk the proper distance to prevent the reach from standing outwardly above the stripper at an angle to the tree-trunk.

The parallel cutters $a^4 a^4$ being inserted into the bark and the intermediate wedge $a^3$ being forced through the bark, (or into a circumferential channel $t^2$,) the cutters form parallel slits in the bark, and as the wedge $a^3$ moves upwardly toward the guide D it cuts and strips the bark in that direction, the sides of each strip being formed by the cutters and before the wedge $a^3$ acts. The strip thus formed will be cut or broken off at its upper end, or a circumferential groove $t^3$ may be cut through the bark on the bark-stripper side of guide D. If the bark-stripper is a single-ended device, (such as Figs. 4, 5, and 6 and described later,) it is carried back to the point of beginning and the operation is repeated; but in this preferred form the bark-stripper is double-ended, and when the first strip is removed the opposite or lower cutters $a^5 a^5$ and intermediate wedge $a^3$ will be put into service at or near where the first set stopped, and then the bark-stripper will be moved down along the trunk, thus stripping off the next strip of bark. To this end the bark-stripper A is provided with a second flexible reach $D^2$, also preferably of rope or chain, carried over a guide $D^3$, attached to a frame $D^4$, (like frame D',) which is secured to the trunk near the ground. The reach $D^2$ may be operated by hand or by a suitable motor. If it is desired to take off a very wide strip, it may be desirable to make the web $a$ flexible, and I consequently show it in the form of a chain, each web $a$ being composed of a plurality of wedge members fast on the chain-web. Such a modification is shown in Figs. 4, 5, and 6. The bark-stripper A' is in this case a single-ended device and is designed to be used only in one direction, a hand-rope being conveniently used to return the device to the point of beginning. It has a flexible web, which obviously may be easily adapted to a double-ended bark-stripper. In this modification the web between the cutters $a^4 a^4$ is made up of a plurality of wedges $r$, secured to members of a web-chain of pivoted plates $r'$, the outer ends of said chain being secured in slots in ears $s$ on the rear portions of the side pieces $a'$ by means of belts $r^2$ and nuts $r^3$. These slots are in a plane at right angles to the plane of the web, and hence the latter may be raised or lowered out of the plane of the sliding surface of the knives and in the desired relation thereto. Each member $r$ of stripper is wedged-shaped at its point or free end and is made fast to its respective chain-plate, which in this case is extended downwardly and outwardly in the form of a curved spring $r^4$ to allow the wedges to give and pass freely over slight obstructions. The frame is also provided with a flexible front piece U and a chain of guide-rolls V. The front piece U is made up of a chain of plates $u$, similar to the web-chain $r'$. The chain $u$ consists of interlocking blocks $v'$, pivoted to each other. Each roll $v^2$ is mounted in a yoke with the shank $v^3$, having a limited up-and-down movement in its block $v'$, but not free to rotate, because of the shank being square in construction. There is in said shank a spring $v^4$, one end of which bears on the yoke and the other on its chain-block. A butt $v^5$ on the free end of the shank limits the downward movement of the roll. A swivel $u'$ in the front piece U serves as an attachment for the traveler, while the downhaul may be made fast to the eyes $r^6$ in the rear of the frame.

What I claim is—

1. In apparatus for removing bark from standing trees, the combination of a tree-engaging, reach-guide support; a reach-guide on said support; a bark-stripper; and a flexible reach attached to said bark-stripper and passing over said guide.

2. In apparatus for removing bark from standing trees, the combination of a pair of independent tree-engaging, reach-guide supports; a reach-guide on each support; a double-ended bark-stripper intermediate said guides; a pair of independent flexible reaches, each attached to the bark-stripper and each passing over a guide.

3. In apparatus for removing bark from trees, a web having a bark-separating edge and a pair of bark-cutters which project forwardly of said web at opposite ends of the web, in combination with a rectangular frame; means for connecting said web to the frame; and a roller journaled in said frame and parallel with said bark-separating edge.

In testimony whereof I affix my signature in presence of two witnesses.

WELLINGTON PARKER KIDDER.

Witnesses:
CHARLES R. BISHOP,
ARTHUR J. RALPH.